US012570078B2

(12) United States Patent
Pineau et al.

(10) Patent No.: US 12,570,078 B2
(45) Date of Patent: Mar. 10, 2026

(54) WATERPROOF-BREATHABLE MULTILAYER STRUCTURE

(71) Applicant: ARKEMA FRANCE, Colombes (FR)

(72) Inventors: Quentin Pineau, Serquigny (FR); Charlotte Herdt, Serquigny (FR); Sébastien Jun Mougnier, Serquigny (FR)

(73) Assignee: ARKEMA FRANCE, Puteaux (FR)

( * ) Notice: Subject to any disclaimer, the term of this patent is extended or adjusted under 35 U.S.C. 154(b) by 195 days.

(21) Appl. No.: 18/250,656

(22) PCT Filed: Oct. 27, 2021

(86) PCT No.: PCT/FR2021/051887
§ 371 (c)(1),
(2) Date: Apr. 26, 2023

(87) PCT Pub. No.: WO2022/090665
PCT Pub. Date: May 5, 2022

(65) Prior Publication Data

US 2023/0391059 A1 Dec. 7, 2023

(30) Foreign Application Priority Data

Oct. 27, 2020 (FR) .................................. FR2010988

(51) Int. Cl.

| | |
|---|---|
| ***B32B 27/12*** | (2006.01) |
| ***B32B 5/02*** | (2006.01) |
| ***B32B 7/12*** | (2006.01) |
| ***B32B 27/08*** | (2006.01) |
| ***B32B 27/18*** | (2006.01) |
| ***B32B 27/28*** | (2006.01) |
| ***B32B 27/34*** | (2006.01) |
| ***B32B 37/12*** | (2006.01) |
| ***B32B 37/18*** | (2006.01) |

(52) U.S. Cl.
CPC ................ *B32B 27/12* (2013.01); *B32B 5/02* (2013.01); *B32B 7/12* (2013.01); *B32B 27/08* (2013.01); *B32B 27/18* (2013.01); *B32B 27/285* (2013.01); *B32B 27/34* (2013.01); *B32B 37/1207* (2013.01); *B32B 37/182* (2013.01); *B32B 2037/1223* (2013.01); *B32B 2262/0261* (2013.01); *B32B 2272/00* (2013.01); *B32B 2305/18* (2013.01); *B32B 2307/3065* (2013.01); *B32B 2307/4026* (2013.01); *B32B 2307/7246* (2013.01); *B32B 2307/7376* (2023.05)

(58) Field of Classification Search
CPC .... B32B 2037/1223; B32B 2262/0261; B32B 2272/00; B32B 2305/18; B32B 2307/3065; B32B 2307/4026; B32B 2307/7246; B32B 2307/732; B32B 2307/7376; B32B 2437/00; B32B 2471/02; B32B 2471/04; B32B 2535/00; B32B 2601/00; B32B 27/08; B32B 27/12; B32B 27/18; B32B 27/20; B32B 27/26; B32B 27/285; B32B 27/34; B32B 37/1207; B32B 37/182; B32B 5/02; B32B 5/022; B32B 5/024; B32B 5/026; B32B 7/12; B32B 7/14
See application file for complete search history.

(56) References Cited

U.S. PATENT DOCUMENTS

| | | | |
|---|---|---|---|
| 5,533,210 | A | 7/1996 | Maderek et al. |
| 6,420,045 | B1 | 7/2002 | Faulhammer et al. |
| 2002/0160674 | A1 | 10/2002 | Kinkelin et al. |
| 2005/0020161 | A1 | 1/2005 | Dummer |
| 2005/0208854 | A1 | 9/2005 | Sadato et al. |
| 2017/0096529 | A1 | 4/2017 | Pineau |
| 2019/0099989 | A1 | 4/2019 | Chang |

FOREIGN PATENT DOCUMENTS

| | | | |
|---|---|---|---|
| CN | 106459727 | A | 2/2017 |
| JP | 2011037101 | A | 2/2011 |
| JP | 2011073141 | A | 4/2011 |
| WO | 2012089977 | A1 | 7/2012 |
| WO | 2014001674 | A1 | 1/2014 |
| WO | 2018087501 | A1 | 5/2018 |
| WO | 2019072755 | A1 | 4/2019 |
| WO | 2019097184 | A1 | 5/2019 |

OTHER PUBLICATIONS

Brule et al, CN 104379642 (Year: 2015).*
International Search Report (PCT/ISA/210) with translation and Written Opinion (PCT/ISA/237) mailed on Jan. 12, 2022, by the European Patent Office as the International Searching Authority for International Application No. PCT/FR2021/051887. (12 pages).
First Office Action (English Translation only) issued on Jun. 12, 2025, by the Chinese National Intellectual Property Administration in related Chinese Application No. 202180073609.X, 11 Pages.

* cited by examiner

*Primary Examiner* — Lawrence D Ferguson
(74) *Attorney, Agent, or Firm* — Boone IP Law

(57) ABSTRACT

The invention relates to a multilayer structure comprising a textile layer comprising at least one polymer chosen from a polyamide and a copolymer containing polyamide blocks and polyether blocks, and combinations thereof; and a film comprising at least one copolymer containing polyamide blocks and polyether blocks, the polyether blocks comprising polyethylene glycol blocks, the polyethylene glycol blocks representing at least 40% by mass relative to the mass of the film; in which the film adheres to the textile layer via a copolyamide.

The invention also relates to a process for manufacturing said multilayer structure, to a process for recycling said multilayer structure and also to an article comprising said multilayer structure.

15 Claims, No Drawings

WATERPROOF-BREATHABLE MULTILAYER STRUCTURE

FIELD OF THE INVENTION

The present invention relates to a waterproof breathable multilayer structure comprising a textile layer, a film comprising at least one copolymer containing polyamide blocks and polyether blocks and optionally a hot-melt adhesive composition.

TECHNICAL BACKGROUND

Many technical fields require textiles with improved and prolonged waterproof-breathable properties. Mention may notably be made of the medical field, medical equipment, surgical gowns, mats, mattresses, bandages, protective clothing; agriculture, agricultural films; packaging; military equipment, maritime equipment, notably marine blankets; transport, aeronautics, automotive; sports; leisure ("warm clothing", "casual clothing"); computers, electronics, furniture; decoration; baby and children's equipment; outdoor equipment; insulation of building walls, under-roofing films.

In these various fields, it is important to have barrier films that protect against liquids, in particular against water, notably waterproof breathable films, which nevertheless ensure the transmission of water vapor. For example, in the case of sportswear such as hiking jackets, it is important to protect the hiker against rain, while at the same time promoting breathability, so as to allow the evaporation of perspiration and thus ensure the comfort of the hiker. It is also desirable to ensure the same comfort for surgeons, nurses, or even patients, who, during surgery, must be protected from any contact with bodily fluids, infectious agents or chemicals. Among the corresponding protective clothing, mention may be made of gowns worn by surgeons and nurses, and surgical drapes placed on patients during operations.

It is known practice to use micro-perforated polytetrafluoroethylene (PTFE) or thermoplastic polyurethane (TPU) membranes for forming this type of film on a textile, using an isocyanate or polyurethane type adhesive. However, the recycling of structures comprising PTFE can be problematic due to the environmental impact associated with the destruction of a textile comprising PTFE. In general, this type of structure can be recycled by separating the PTFE membrane from the textile. In addition, the recycling of structures comprising TPU can present drawbacks, since this type of film may be incompatible with the textile (for instance polyamide), which leads to recycled products of lower quality.

Moreover, the presence of adhesive that is incompatible with the textile also makes the recycling of the structure difficult and leads to recycled products with deteriorated properties compared to those of the initial product.

JP 2011037101 relates to a waterproof breathable textile that is widely applicable for cold-protection clothing, sportswear, casual clothing and the like, while at the same time maintaining excellent waterproofing performance and which is reusable after recycling.

JP 2011073141 relates to a waterproof breathable polyamide-based textile that is advantageous in terms of cost and waterproof-breathable performance.

US 2019/0099989 relates to a composite textile product comprising a polyamide textile layer and a polyamide film bonded to the polyamide textile layer.

U.S. Pat. No. 6,420,045 relates to a multilayer structure comprising a material coated with a copolymer containing polyamide blocks and hydrophilic blocks, the copolymer having a melting point below 135° C.

U.S. Pat. No. 5,533,210 relates to a fully recyclable jacket, the components of which consist of thermoplastic synthetic polymers that can be homogeneously blended with each other in the molten state.

US 2005/0020161 describes a waterproof breathable, recyclable and stretchable multilayer composite textile which comprises at least one layer of a woven, knitted or nonwoven fabric of stretchable two-component fibers, and an elastomeric film or a coating of the same polymer.

US 2002/0160674 relates to a process for producing a wash-resistant binder between a waterproof breathable copolyetherester-based film and a polyester-based substrate.

US 2005/0208854 describes a laminated fabric with a structure in which a first textile is laminated on one side of a durable film with a temporary adhesive layer interposed therebetween and a second textile is laminated on the other side of the durable film with a durable adhesive layer interposed therebetween.

WO 2019/097184 relates to a stretchable, flexible, waterproof breathable block copolymer-based film comprising at least one rigid polyamide block and at least one flexible block, characterized in that the copolymer comprises at least one carboxylic acid chain end blocked with a polycarbodiimide.

WO 2012/089977 describes a waterproof breathable film comprising an amide block copolyether and/or an ester block copolyether and/or a functionalized polyolefin, and starch. This film can be used as an under-roofing film or wall insulation film for a dwelling.

WO 2014/001674 describes the use of thermoplastic starch for the manufacture of an ultra-thin waterproof breathable and adhesive film, said starch being in the form of an alloy with hydrophilic TPE. This film can be used in a textile product.

WO 2018/087501 relates to an extrudable polymer composition comprising at least one copolymer containing soft blocks and rigid blocks and at least one polyol containing at least three hydroxyl groups, the composition being used in extrusion processes to manufacture water vapor permeable objects.

WO 2019/072755 relates to a functional product comprising a waterproof breathable film lacking an additional layer, such as a textile layer.

There is a need to provide a waterproof-breathable and recyclable structure with performance that shows good durability over time. In addition, there is a need to provide a recyclable waterproof breathable structure whose properties are conserved after recycling.

SUMMARY OF THE INVENTION

The invention relates firstly to a multilayer structure comprising:

a textile layer comprising at least one polymer chosen from a polyamide and a copolymer containing polyamide blocks and polyether blocks and also combinations thereof; and a film comprising at least one copolymer containing polyamide blocks and polyether blocks (also referred to as PEBA copolymer), the polyether blocks comprising polyethylene glycol blocks, the polyethylene glycol blocks representing at least 40% by mass relative to the mass of the film; in which the film adheres to the textile layer via a copolyamide.

According to certain embodiments, the PEBA copolymer of the film comprises copolyamide blocks.

According to a particular embodiment, the film in which the PEBA copolymer comprises copolyamide blocks adheres directly to the textile layer.

According to certain embodiments, the film is attached to the textile layer via a hot-melt adhesive composition comprising the copolyamide, the copolyamide preferably comprising units derived from polyethylene glycol monomers representing at least 20% by mass relative to the mass of the copolyamide.

According to certain embodiments, the copolyamide of the hot-melt adhesive composition is chosen from PA 6/6.6/12, PA 6/6.6/11, PA 6/6.10/11, PA 6/6.10/12, PA 6/6.12/11, PA 6/6.12/12, PA 6/6.12/11/PEG.12, PA 6/11/PEG.6, PA 6/6.6/11/12 and PA 6/Pip.12/12.

According to certain embodiments, the hot-melt adhesive composition has a melting point that is lower than the melting point of the textile layer.

According to certain embodiments, the hot-melt adhesive composition has a melting point of less than or equal to 150° C., and preferably less than or equal to 130° C.; and/or a melt volume rate MVR of from 2 to 200 $cm^3$/10 min, and preferably from 5 to 70 $cm^3$/10 min.

According to certain embodiments, the polymer of the textile layer is a polyamide and preferably the textile layer consists of the at least one polyamide.

According to certain embodiments, the polyamide blocks of the copolymer containing polyamide blocks and polyether blocks in the film are chosen from polyamide 11 blocks, polyamide 12 blocks, polyamide 6 blocks, polyamide 6.10 blocks, polyamide 6.12 blocks, polyamide 10.10 blocks, polyamide 10.12 blocks, polyamide 10.14 blocks, and combinations thereof, and more preferably polyamide 11 blocks, polyamide 12 blocks, combinations thereof, and copolymers thereof.

According to certain embodiments, the film has a thickness of from 1 μm to 50 μm, preferably from 10 μm to 30 μm and even more preferentially from 10 μm to 20 μm.

According to certain embodiments, the film consists of the PEBA copolymer and optionally one or more additives chosen from inert colorants, fillers, surfactants, crosslinking agents, nucleating agents, reactive compounds, mineral or organic flame retardants, ultraviolet or infrared light absorbing agents, waxes, heat stabilizers, antiblocking agents, antifoams, and ultraviolet or infrared fluorescent agents.

According to certain embodiments, the film is obtained by recycling a multilayer structure, preferably by recycling a multilayer structure as described above.

The invention also relates to a process for manufacturing the multilayer structure as described above, involving:

- providing the textile layer;
- providing the film;
- optionally applying the hot-melt adhesive composition to a surface of the textile layer or the film; and
- placing the film in contact with the textile layer, the hot-melt adhesive composition being, if present in the multilayer structure, between the film and the textile layer.

The invention also relates to a process for recycling the multilayer structure as described above, involving:

- grinding the multilayer structure to obtain particles;
- melting the particles to obtain a molten mixture; and
- forming granules from the molten mixture.

The invention also relates to an article comprising the multilayer structure as described above, which may be chosen from a dressing, a gauze, a cloth, a carpet, a rug, an upholstery, a surface covering, an interior covering, a couch, a curtain, bedding, a mattress, a pillow, a garment, notably an item of sportswear or a medical garment.

The present invention makes it possible to meet the need expressed above. More particularly, it provides a waterproof-breathable and recyclable structure, with performance that shows good durability over time. Moreover, it provides a waterproof-breathable and recyclable structure, whose properties are conserved after recycling.

This is accomplished by means of the multilayer structure of the present invention. More particularly, the multilayer structure of the invention comprises a textile layer and a film that adheres to the textile layer via a copolyamide. Thus, the film may adhere directly to the textile layer or indirectly, i.e. via a hot-melt adhesive composition which is in contact with the textile layer and the film. In other words, the copolyamide can either be part of the film or belong to a separate composition. The film comprises at least 40% by mass of the polyethylene glycol blocks relative to the mass of the film. This makes it possible to form a waterproof breathable film, avoiding films made from fluoropolymers (for instance PTFE), which makes it possible to facilitate and improve the recycling of the entire structure, without a negative impact on the environment. This also makes it possible to form a waterproof breathable film that is compatible with the textile layer (comprising polyamide or PEBA), which again facilitates recycling and makes it possible to obtain recycled products having properties and performance that are comparable with those of the product before recycling.

In the case where the multilayer structure is free of hot-melt adhesive composition, the copolymer containing polyamide blocks and polyether blocks of the film comprises copolyamide blocks. This allows the film to have satisfactory adhesion, allowing it to adhere directly to the textile layer.

In the case where the multilayer structure also comprises a hot-melt adhesive composition, this composition preferably comprises at least one copolyamide comprising units derived from polyethylene glycol monomers representing at least 20% by mass relative to the mass of the copolyamide. This allows the hot-melt adhesive composition to adhere the film to the textile layer, without unacceptably degrading the waterproof-breathable properties of the structure.

Moreover, the use of a hot-melt adhesive composition comprising polyamide also allows this compatibility with the textile layer to be maintained so as to increase the efficiency and quality of recycling.

DETAILED DESCRIPTION

The invention is now described in more detail and in a non-limiting way in the description which follows.

The multilayer structure according to the invention comprises a textile layer, a film and optionally a hot-melt adhesive composition between the textile layer and the film. In other words, the film is adhered directly to the textile layer or the hot-melt adhesive composition allows the film to adhere to the textile layer.

Textile Layer

The textile layer comprises at least one polymer which may be chosen from polyamide, a copolymer containing polyamide blocks and polyether blocks, and combinations thereof. Typically, the textile layer comprises polyamide fibers and/or fibers of a copolymer containing polyamide blocks and polyether blocks.

The polyamide may be a homopolyamide or a copolyamide.

Preferably, the polyamide included in the textile layer is chosen from PA 6, PA 6.6, PA 11 and PA 12.

According to certain preferred embodiments, the polymer of the textile layer is a copolymer containing polyamide blocks and polyether blocks.

According to preferred embodiments, the polymer of the textile layer is a polyamide, as described above.

According to other embodiments, the polymer of the textile layer is a blend of polyamide and of copolymer containing polyamide blocks and polyether blocks.

According to certain embodiments, the textile layer comprises a single polymer according to the invention. In this case, it is preferable for this polymer to be polyamide and preferably one of the preferred polyamides mentioned above.

Alternatively, the textile layer may comprise more than one polymer according to the invention, for example two, or three, or four, or five, or more than five polymers. In this case, it is preferable for at least one of these polymers (and preferably all of the polyamides) to be one of the polyamides and preferably the preferred polyamides mentioned above.

According to certain preferred embodiments, the textile layer consists essentially of, or even consists of, one or more polyamides.

The fibers of the textile layer may be monofilament or multifilament, textured or untextured, and are chosen in terms of cost and texture, and such fibers are preferably formed using polyamide fibers having a titer of 15 to 2000 dtex and preferably 15 to 1000 dtex.

According to certain embodiments, the fibers in the textile layer may be two-component or multi-component fibers i.e. fibers in which two polymers of the same general class are in a side-by-side or eccentric sheath-core relationship.

The textile layer may have a melting point of from 150 to 300° C., and preferably from 180 to 270° C. The melting point can be determined according to the standard ISO 11357-3 Plastics—Differential scanning calorimetry (DSC) Part 3.

The textile layer may be a woven, nonwoven or knitted fabric. Thus, the textile layer according to the invention may be a woven, knitted, nonwoven or carpet layer (surface). This layer may be, for example, a layer of a dressing, a gauze, a cloth, a carpet, a rug, an upholstery, a surface covering, an interior covering, a sofa, a curtain, bedding, a mattress, a pillow, clothing such as an item of sportswear or a medical garment.

Preferably, the textile layer comprises fibers obtained from biobased starting materials.

Preferably, the textile layer also comprises natural fibers, man-made fibers made from natural starting materials, mineral fibers and/or metal fibers.

Film

The film according to the invention comprises at least one copolymer containing polyamide blocks and polyether blocks. It is a waterproof breathable film. The term "waterproof breathable" means permeable to water vapor and impermeable to liquid water.

PEBA copolymers result from the polycondensation of polyamide blocks bearing reactive ends with polyether blocks bearing reactive ends, such as, inter alia:

1) polyamide blocks bearing diamine chain ends with polyoxyalkylene blocks bearing dicarboxylic chain ends;
2) polyamide blocks bearing dicarboxylic chain ends with polyoxyalkylene blocks bearing diamine chain ends, obtained, for example, by cyanoethylation and hydrogenation of α,ω-dihydroxylated aliphatic polyoxyalkylene blocks, known as polyetherdiols;
3) polyamide blocks bearing dicarboxylic chain ends with polyetherdiols, the products obtained being, in this particular case, polyetheresteramides.

The polyamide blocks bearing dicarboxylic chain ends originate, for example, from the condensation of polyamide precursors in the presence of a chain-limiting dicarboxylic acid. The polyamide blocks bearing diamine chain ends originate, for example, from the condensation of polyamide precursors in the presence of a chain-limiting diamine.

The polymers bearing polyamide blocks and polyether blocks may also comprise randomly distributed units.

Three types of polyamide blocks may advantageously be used.

According to a first type, the polyamide blocks originate from the condensation of a dicarboxylic acid, in particular those containing from 4 to 20 carbon atoms, preferably those containing from 6 to 18 carbon atoms, and of an aliphatic, cycloaliphatic or aromatic diamine, in particular those containing from 2 to 20 carbon atoms, preferably those containing from 5 to 14 carbon atoms.

As examples of dicarboxylic acids, mention may be made of 1,4-cyclohexanedicarboxylic acid, butanedioic acid, adipic acid, azelaic acid, suberic acid, sebacic acid, dodecanedicarboxylic acid, octadecanedicarboxylic acid, terephthalic acid and isophthalic acid, but also dimerized fatty acids.

As examples of diamines, mention may be made of tetramethylenediamine, 1,5-pentanediamine, 2-methylpentane-1,5-diamine, hexamethylenediamine, 1,10-decamethylenediamine, dodecamethylenediamine, trimethylhexamethylenediamine, the isomers of bis(4-aminocyclohexyl) methane (BACM), bis(3-methyl-4-aminocyclohexyl) methane (BMACM) and 2,2-bis(3-methyl-4-aminocyclohexyl)propane (BMACP), and para-aminodicyclohexylmethane (PACM), and isophoronediamine (IPDA), 2,6-bis(aminomethyl)norbornane (BAMN) and piperazine (Pip).

Advantageously, PA 4.12, PA 4.14, PA 4.18, PA 5.10, PA 5.12, PA 5.14, PA 6.10, PA 6.12, PA 6.14, PA 6.18, PA 9.12, PA 10.10, PA 10.12, PA 10.14 and PA 10.18 blocks are used. In the notation PA X.Y, X represents the number of carbon atoms derived from the diamine residues and Y represents the number of carbon atoms derived from the diacid residues, as is conventional.

According to a second type, the polyamide blocks result from the condensation of one or more α,ω-aminocarboxylic acids and/or of one or more lactams containing from 6 to 12 carbon atoms in the presence of a dicarboxylic acid containing from 4 to 12 carbon atoms or of a diamine. As examples of lactams, mention may be made of caprolactam, oenantholactam and lauryllactam. As examples of α,ω-aminocarboxylic acids, mention may be made of aminocaproic acid, 7-aminoheptanoic acid, 11-aminoundecanoic acid and 12-aminododecanoic acid.

Advantageously, the polyamide blocks of the second type are made of polyamide 11, polyamide 12 or polyamide 6. In the notation PA X, X represents the number of carbon atoms derived from amino acid residues.

According to a third type, the polyamide blocks result from the condensation of at least one α,ω-aminocarboxylic acid (or a lactam), at least one diamine and at least one dicarboxylic acid.

In this case, the polyamide PA blocks are prepared by polycondensation:

of the linear aliphatic, cycloaliphatic or aromatic diamine (s) containing X carbon atoms;

of the dicarboxylic acid(s) containing Y carbon atoms; and of the comonomer(s) {Z}, chosen from lactams and α,ω-aminocarboxylic acids containing Z carbon atoms and equimolar mixtures of at least one diamine containing X1 carbon atoms and of at least one dicarboxylic acid containing Y1 carbon atoms, (X1, Y1) being different from (X, Y), said comonomer(s) {Z} being introduced in a weight proportion ranging up to 50%, preferably up to 20%, even more advantageously up to 10% relative to the total amount of polyamide-precursor monomers;

in the presence of a chain limiter chosen from dicarboxylic acids;

advantageously, the dicarboxylic acid containing Y carbon atoms is used as chain limiter, which is introduced in excess relative to the stoichiometry of the diamine (s).

According to one variant of this third type, the polyamide blocks result from the condensation of at least two α,ω-aminocarboxylic acids or of at least two lactams containing from 6 to 12 carbon atoms or of one lactam and one aminocarboxylic acid not having the same number of carbon atoms, in the optional presence of a chain limiter. As examples of aliphatic α,ω-aminocarboxylic acids, mention may be made of aminocaproic acid, 7-aminoheptanoic acid, 11-aminoundecanoic acid and 12-aminododecanoic acid. As examples of lactams, mention may be made of caprolactam, oenantholactam and lauryllactam. As examples of aliphatic diamines, mention may be made of 1,5-pentanediamine, 2-methyl-1,5-pentanediamine, hexamethylenediamine, dodecamethylenediamine and trimethylhexamethylenediamine. As examples of cycloaliphatic diacids, mention may be made of 1,4-cyclohexanedicarboxylic acid. As examples of aliphatic diacids, mention may be made of butanedioic acid, adipic acid, azelaic acid, suberic acid, sebacic acid, dodecanedicarboxylic acid, dimerized fatty acids (these dimerized fatty acids preferably have a dimer content of at least 98%; they are preferably hydrogenated; they are sold under the brand name Pripol by the company Croda, or under the brand name Radiacid by the company Oleon) and α,ω-diacid polyoxyalkylenes. As examples of aromatic diacids, mention may be made of terephthalic acid (T) and isophthalic acid (1). As examples of cycloaliphatic diamines, mention may be made of the isomers of bis(4-aminocyclohexyl)methane (BACM), bis(3-methyl-4-aminocyclohexyl) methane (BMACM) and 2,2-bis(3-methyl-4-aminocyclohexyl)propane (BMACP), and para-aminodicyclohexylmethane (PACM). The other diamines commonly used may be isophoronediamine (IPDA), 2,6-bis (aminomethyl)norbornane (BAMN) and piperazine.

As examples of polyamide blocks of the third type, mention may be made of the following:

PA 6.6/6, in which 6.6 denotes hexamethylenediamine units condensed with adipic acid and 6 denotes units resulting from the condensation of caprolactam;

PA 6.6/6.10/11/12 in which 6.6 denotes hexamethylenediamine condensed with adipic acid; 6.10 denotes hexamethylenediamine condensed with sebacic acid; 11 denotes units resulting from the condensation of aminoundecanoic acid; and 12 denotes units resulting from the condensation of lauryllactam.

The notations PA X/Y, PA X/Y/Z, etc. relate to copolyamides in which X, Y, Z, etc. represent homopolyamide units as described above.

Advantageously, said at least one polyamide block of the copolymer(s) used in the film of the invention comprises at least one of the following polyamide monomers: 6, 11, 12, 5.4, 5.9, 5.10, 5.12, 5.13, 5.14, 5.16, 5.18, 5.36, 6.4, 6.9, 6.10, 6.12, 6.13, 6.14, 6.16, 6.18, 6.36, 10.4, 10.9, 10.10, 10.12, 10.13, 10.14, 10.16, 10.18, 10.36, 10. T, 12.4, 12.9, 12.10, 12.12, 12.13, 12.14, 12.16, 12.18, 12.36, 12.T and mixtures or copolymers thereof; and preferably chosen from the following polyamide monomers: 6, 11, 12, 6.10, 10.10, 10.12, and mixtures or copolymers thereof.

According to preferred embodiments, the polyamide blocks of the PEBA copolymer are chosen from polyamide 6 blocks, polyamide 11 blocks, polyamide 6.10 blocks, polyamide 6.12 blocks, polyamide 10.10 blocks, polyamide 10.12 blocks, polyamide 10.14 blocks, polyamide 12 blocks, polyamide 11/12 blocks, combinations thereof and copolymers thereof.

The polyether blocks of the PEBA copolymer of the invention comprise blocks derived from polyethylene glycol (PEG) representing at least 40% by mass relative to the mass of the film. For example, the polyether blocks of the PEBA copolymer may comprise from 40% to 45%; or from 45% to 50%; or from 50% to 55%; or from 55% to 60%; or from 60% to 65%; or from 65% to 70%; or from 70% to 75%; or from 75% to 80%; or from 80% to 85% by mass of PEG blocks relative to the mass of the film. The mass proportion of PEG in the film can be determined by NMR spectroscopy or infrared spectroscopy.

The polyether blocks may also comprise blocks derived from PPG (propylene glycol), and/or blocks derived from PO3G (polytrimethylene glycol), and/or blocks derived from PTMG (polytetramethylene glycol or polytetrahydrofuran). The PEBA copolymers may comprise in their chain several types of polyethers, the copolyethers possibly being in block or statistical form.

According to certain embodiments, the polyether blocks of the PEBA copolymer consist of PEG blocks.

Use may also be made of blocks obtained by oxyethylation of bisphenols, for instance bisphenol A. The latter products are described in patent EP 613 919.

The polyether blocks may also consist of ethoxylated primary amines. As examples of ethoxylated primary amines, mention may be made of the products of formula:

[Chem 1]

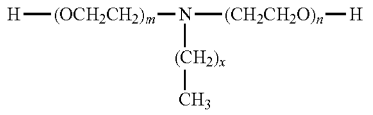

in which m and n are between 1 and 20, and x is between 8 and 18. These products are commercially available under the brand name Noramox® from the company Arkema and under the brand name Genamin® from the company Clariant.

The flexible polyether blocks may comprise polyoxyalkylene blocks bearing $NH_2$ chain ends, such blocks being able to be obtained by cyanoacetylation of α,ω-dihydroxylated aliphatic polyoxyalkylene blocks referred to as polyetherdiols. More particularly, use may be made of the Jeffamine products (for example Jeffamine® D400, D2000, ED 2003, XTJ 542, which are commercial products from the company Huntsman, also described in patents JP2004346274, JP2004352794 and EP1482011). Some of these products (notably Jeffamine® ED2003) include PEG blocks.

The polyether diol blocks are either used in unmodified form and copolycondensed with polyamide blocks bearing carboxylic end groups, or they are converted into polyetherdiamines and condensed with polyamide blocks bearing carboxylic end groups. The general method for the two-step preparation of PEBA copolymers containing ester bonds between the PA blocks and the PE blocks is known and is described, for example, in French patent FR 2 846 332. The general method for the preparation of the PEBA copolymers of the invention containing amide bonds between the PA blocks and the PE blocks is known and is described, for example, in European patent EP 1 482 011. The polyether blocks may also be mixed with polyamide precursors and a chain-limiting diacid to prepare polymers containing polyamide blocks and polyether blocks having randomly distributed units (one-step process).

Needless to say, the name PEBA in the present description of the invention relates not only to the Pebax® products sold by Arkema, to the Vestamid® products sold by Evonik® and to the Grilamid® products sold by EMS, but also to the Pelestat® type PEBA products sold by Sanyo or to any other PEBA from other suppliers.

Advantageously, the PEBA copolymers may contain polyamide blocks as PA 6, as PA 11, as PA 12, PA 6.10, PA 6.12, as PA 6.6/6, as PA 10.10, as PA 10.12 and/or as PA 6.14, preferably PA 11 and/or PA 12 blocks; and polyether blocks as PEG.

PEBA copolymers that are particularly preferred in the context of the invention are copolymers including blocks from among: PA 11 and resulting from PEG; PA 12 and resulting from PEG; PA 6.10 and resulting from PEG; PA 10.10 and resulting from PEG; PA 10.12 and resulting from PEG; PA 6.12 and resulting from PEG; PA 6 and resulting from PEG; PA 11/12 and resulting from PEG.

The PEBA copolymer may also comprise compounds with a functionality of greater than 2. The term "functionality" means the number of reactive functions present in the monomers and capable of participating in the growth of the chain. These compounds may be, for example, tri- or tetrafunctional polyethers or compounds such as trimethylolpropane, dimethylolpropane, pentaerythritol.

Whereas the block copolymers described above generally comprise at least one polyamide block and at least one polyether block, the present invention also covers all the copolymers comprising two, three, four (or even more) different blocks chosen from those described in the present description, provided that these blocks include at least polyamide and polyether blocks.

Advantageously, the copolymer is a block segmented copolymer comprising three different types of blocks (referred to as "triblock" in the present description of the invention), which result from the condensation of several of the blocks described above.

The number-average molar mass of the polyamide blocks in the PEBA copolymer is preferably from 400 to 20 000 g/mol, more preferentially from 500 to 10 000 g/mol, preferentially from 500 to 2000 g/mol and even more preferentially from 1000 to 1500 g/mol. In certain embodiments, the number-average molar mass of the polyamide blocks in the PEBA copolymer is from 400 to 1000 g/mol, or from 1000 to 1500 g/mol, or from 1500 to 2000 g/mol, or 2000 to 2500 g/mol, or 2500 to 3000 g/mol, or 3000 to 3500 g/mol, or 3500 to 4000 g/mol, or 4000 to 5000 g/mol, or from 5000 to 6000 g/mol, or from 6000 to 7000 g/mol, or from 7000 to 8000 g/mol, or from 8000 to 9000 g/mol, or from 9000 to 10 000 g/mol, or from 10 000 to 11000 g/mol, or from 11000 to 12000 g/mol, or from 12000 to 13000 g/mol, or from 13000 to 14000 g/mol, or from 14000 to 15000 g/mol, or from 15000 to 16000 g/mol, or from 16000 to 17000 g/mol, or from 17000 to 18000 g/mol, or from 18000 to 19000 g/mol, or from 19000 to 20 000 g/mol.

The number-average molar mass of the polyether blocks is preferably from 100 to 6000 g/mol, more preferentially from 200 to 3000 g/mol and even more preferentially from 200 to 2000 g/mol. In certain embodiments, the number-average molar mass of the polyether blocks is from 100 to 200 g/mol, or from 200 to 500 g/mol, or from 500 to 800 g/mol, or from 800 to 1000 g/mol, or from 1000 to 1500 g/mol, or from 1500 to 2000 g/mol, or from 2000 to 2500 g/mol, or from 2500 to 3000 g/mol, or from 3000 to 3500 g/mol, or from 3500 to 4000 g/mol, or from 4000 to 4500 g/mol, or from 4500 to 5000 g/mol, or from 5000 to 5500 g/mol, or from 5500 to 6000 g/mol. The number-average molar mass is set by the content of chain limiter. It may be calculated according to the equation:

$$M_n = n_{monomer} \times MW_{repeating\ unit} / n_{chain\ limiter} + MW_{chain\ limiter}$$

In this formula, $n_{monomer}$ represents the number of moles of monomer, $n_{chain\ limiter}$ represents the number of moles of limiter (for example diacid) in excess, $MW_{repeating\ unit}$ represents the molar mass of the repeating unit, and $MW_{chain\ limiter}$ represents the molar mass of the limiter (for example diacid) in excess.

The number-average molar mass of the polyamide blocks and of the polyether blocks may be measured before the copolymerization of the blocks by gel permeation chromatography (GPC).

The mass proportion of polyether blocks in the copolymer may be from 40% to 85% relative to the total weight of the copolymer, and preferably from 50% to 60% relative to the total weight of the copolymer. The mass proportions of blocks in the copolymer can be determined from the number-average molar masses of the blocks.

The film according to the invention adheres to the textile layer via a copolyamide. According to certain embodiments, this copolyamide forms part of the PEBA copolymer. In other words, the PEBA copolymer comprises copolyamide blocks. In this case, the film adheres directly to the textile layer.

Thus, in the case where copolyamide forms part of the PEBA copolymer, the polyamide blocks of the PEBA copolymer comprise at least two distinct repeating units, these distinct units being formed from at least two different monomers. In other words, in this case, the polyamide blocks of the PEBA copolymer are copolyamide blocks. The different monomers for forming the copolyamide blocks are as detailed above.

Preferred copolyamide blocks may be chosen from PA 6/12; PA 6/11; PA 6/10.10; PA 6/10.12; PA 6/10.14; PA 11/12; PA 11/10.10; PA 11/10.12; PA 11/10.14; PA 12/10.10; PA 12/10.12; PA 12/10.14; PA 6/6.6/12; PA 6/6.10/12; PA 6/6.12/12; PA 6/6.6/11; PA 6/6.10/11 and PA 6/6.12/11.

According to certain embodiments, the film comprises a single PEBA copolymer. In this case, the PEBA included in the film is as described above.

Alternatively, the film may comprise more than one PEBA copolymer, for example two, or three, or four, or five, or more than five PEBA copolymers. In this case, it is preferable for at least one of these PEBA copolymers to be a PEBA copolymer according to the invention. It is even more preferable for all of the PEBA copolymers to be according to the invention.

According to certain embodiments, the film of the invention consists essentially of, or even consists of, one or more PEBA copolymers according to the invention and optionally one or more additives.

For example, the film of the invention may comprise one or more additives, which may comprise inert colorants such as titanium dioxide, fillers, surfactants, crosslinking agents, nucleating agents, reactive compounds, mineral or organic flame retardants, ultraviolet (UV) or infrared (IR) light absorbers and UV or IR fluorescent agents, waxes, heat stabilizers (for example phenolic or phosphorus based), antiblocking agents, antifoams. Typical fillers include talc, calcium carbonate, clay, silica, mica, wollastonite, feldspar, aluminum silicate, alumina, hydrated alumina, glass microspheres, ceramic microspheres, thermoplastic microspheres, baryte, and wood flour.

The additives are optionally present in a weight content of from 0 to 10% and preferably from 0 to 5%. For example, one or more additives may be present in a weight content of from 0 to 0.5%; or from 0.5% to 1%; or from 1% to 2%; or from 2% to 3%; or from 3% to 4%; or from 4% to 5%; or from 5% to 6%; or from 6% to 7%; or from 7% to 8%; or from 8% to 9%; or from 9% to 10%.

These additives make it possible to modify one or more physical properties of the film.

According to other embodiments, the film may comprise other components besides the PEBA copolymer(s) according to the invention and the abovementioned additives.

In this case, the film may comprise one or more additional polymers (other than PEBAs) chosen, for example, from ethylene vinyl acetate (EVA) polymers and/or ionomers (i.e. ionically crosslinked thermoplastic copolymers). For example, the film may comprise additional polymers in a weight content of less than or equal to 30%.

The film of the invention may notably be manufactured by extrusion. Preferably the extrusion is performed hot, at a temperature ranging from 170 to 280° C., and preferably from 180 to 280° C.

Alternatively, the film of the invention may be manufactured by sheath blowing, by lamination or by extrusion-coating.

Preferably, the film is a monolithic film. In other words, the film according to the invention is free of perforations (such as microperforations). This avoids clogging or tearing of the perforations and thus achieves better durability of the film properties over time.

The film may have a thickness of from 1 to 50 μm and preferably from 10 to 20 μm.

Preferably, the material constituting the film has a permeability to water vapor (MVTR, for "Moisture Vapor Transmission Rate") of at least 700 $g/m^2$ per 24 hours, at 23° C., at a relative humidity of 50%, for a reference thickness of 30 μm. More preferably, the permeability to water vapor MVTR of the film is at least 800 $g/m^2$/24 h, at 23° C., at a relative humidity of 50%, for a film thickness of 30 μm. In particular, the MVTR membrane permeability may range from 700 to 800 $g/m^2$/24 h, or from 800 to 900 $g/m^2$/24 h, or from 900 to 1000 $g/m^2$/24 h, or from 1000 to 1200 $g/m^2$/24 h, or from 1200 to 1500 $g/m^2$/24 h, or from 1500 to 2000 $g/m^2$/24 h, or from 2000 to 2500 $g/m^2$/24 h, or from 2500 to 3000 $g/m^2$/24 h, or from 3000 to 3500 $g/m^2$/24 h, or from 3500 to 4000 $g/m^2$/24 h, or from 4000 to 4500 $g/m^2$/24 h, or from 4500 to 5000 $g/m^2$/24 h, at 23° C., at a relative humidity of 50%, for a film thickness of 30 μm. The permeability to water vapor (MVTR) of the film, at 23° C., for a relative humidity of 50%, for a film thickness of 30 μm, may be measured according to the standard ASTM E96 B.

Hot-Melt Adhesive Composition

As mentioned above, the film according to the invention adheres to the textile layer via a copolyamide. According to certain embodiments, this copolyamide forms part of a separate hot-melt adhesive composition that is located between the textile layer and the film and allows the film to adhere to the textile layer.

The term "hot-melt adhesive composition" (or "hot-melt adhesive") refers to an adhesive that is deposited in a molten state on a surface to be bonded, where adhesion is then achieved by cooling the composition back to a solid state.

The hot-melt adhesive composition is (when present) in contact with the textile layer and the film.

The hot-melt adhesive composition according to the invention comprises at least one copolyamide. The "copolyamides", abbreviated as "COPA", comprise at least two distinct repeating units, these distinct units being formed from at least two different monomers. Copolyamides are thus prepared from two or more comonomers chosen from an amino acid, a lactam and/or a dicarboxylic acid with a diamine.

Thus, the term "copolyamide" (abbreviated as CoPA) means the polymerization products of at least two different monomers chosen from:

- monomers of amino acid or aminocarboxylic acid type, and preferably α,ω-aminocarboxylic acids;
- monomers of lactam type containing from 3 to 18 carbon atoms in the main ring and which may be substituted;
- monomers of "diamine.diacid" type resulting from reaction between an aliphatic diamine containing from 4 to 36 carbon atoms and a dicarboxylic acid containing from 4 to 36 carbon atoms, and
- mixtures thereof, with monomers containing a different carbon number in the case of mixtures between a monomer of amino acid type and a monomer of lactam type.

As examples of α,ω-amino acids, mention may be made of those containing from 4 to 18 carbon atoms, such as aminocaproic acid, 7-aminoheptanoic acid, 11-aminoundecanoic acid, n-heptyl-11-aminoundecanoic acid and 12-aminododecanoic acid.

As examples of lactams, mention may be made of those containing from 3 to 18 carbon atoms on the main ring and which may be substituted. Mention may be made, for example, of β,β-dimethylpropiolactam, α,α-dimethylpropriolactam, amylolactam, caprolactam also known as lactam 6, capryllactam, also known as lactam 8, oenantholactam, 2-pyrrolidone and lauryllactam, also known as lactam 12.

As regards the monomers of "diamine.diacid" type: As examples of dicarboxylic acids, mention may be made of acids containing from 4 to 36 carbon atoms. Mention may be made, for example, of adipic acid, sebacic acid, azelaic acid, suberic acid, dodecanedioic acid, tetradecanedioic acid, isophthalic acid, butanedioic acid, 1,4-cyclohexanedicarboxylic acid, terephthalic acid, the sodium or lithium salt of sulfoisophthalic acid, dimerized fatty acids (these dimerized fatty acids have a dimer content of at least 98% and are preferably hydrogenated) and dodecanedioic acid $HOOC—(CH_2)_{10}—COOH$.

As examples of diamines, mention may be made of aliphatic diamines containing from 4 to 18 atoms, which may be arylic and/or saturated cyclic. Examples that may be mentioned include pentanediamine, hexamethylenediamine, piperazine (abbreviated as "Pip"), tetramethylenediamine, octamethylenediamine, decamethylenediamine, dodecamethylenediamine, 2,2,4-trimethyl-1,6-diaminohexane, polyol diamines, isophoronediamine (IPD), 2-methyl-1,5-pentamethylenediamine (MPDM), bis(aminocyclohexyl) methane (BACM), bis(3-methyl-4-aminocyclohexyl)methane (BMACM), meta-xylylenediamine, bis(p-aminocyclohexyl)methane and trimethylhexamethylenediamine.

As examples of "diamine.diacid" type monomers, mention may be made of those resulting from the condensation of hexamethylenediamine with a C6 to C36 diacid, notably the monomers: 6.6, 6.10, 6.11, 6.12, 6.14 and 6.18. Mention may be made of monomers resulting from the condensation of decanediamine with a C6 to C36 diacid, notably the monomers: 10.10, 10.12, 10.14 and 10.18.

As examples of copolyamides formed from the various types of monomers described above, mention may be made of copolyamides resulting from the condensation of at least two α,ω-aminocarboxylic acids or of two lactams or of one lactam and one α,ω-aminocarboxylic acid. Mention may also be made of copolyamides resulting from the condensation of at least one α,ω-aminocarboxylic acid (or a lactam), at least one diamine and at least one dicarboxylic acid. Mention may also be made of copolyamides resulting from the condensation of an aliphatic diamine with an aliphatic dicarboxylic acid and of at least one other monomer chosen from aliphatic diamines different from the preceding one and aliphatic diacids different from the preceding one.

As examples of copolyamides, mention may be made of copolymers of caprolactam and lauryllactam (PA 6/12), copolymers of caprolactam, hexamethylenediamine and adipic acid (PA 6/6.6), copolymers of caprolactam, lauryllactam, hexamethylenediamine and adipic acid (PA 6/12/6.6), copolymers of caprolactam, hexamethylenediamine and azelaic acid, 11-aminoundecanoic acid and lauryllactam, (PA 6/6.9/11/12), copolymers of caprolactam, adipic acid and hexamethylenediamine, 11-aminoundecanoic acid, and lauryllactam (PA 6/6.6/11/12), copolymers of hexamethylenediamine, azelaic acid and lauryllactam (PA 6.9/12), copolymers of 2-pyrrolidone and caprolactam (PA 4/6), copolymers of 2-pyrrolidone and lauryllactam (PA 4/12), copolymers of caprolactam and 11-aminoundecanoic acid (PA 6/11), copolymers of lauryllactam and capryllactam (PA 12/8), copolymers of 11-aminoundecanoic acid and 2-pyrrolidone (PA 11/4), copolymers of capryllactam and caprolactam (PA 8/6), copolymers of capryllactam and 2-pyrrolidone (PA 8/4), copolymers of lauryllactam and capryllactam (PA 12/8), copolymers of lauryllactam and 11-aminoundecanoic acid (PA 12/11).

The copolyamide of the hot-melt adhesive composition according to the invention preferably also comprises units derived from polyethylene glycol (PEG) monomers. In other words, apart from the units forming the copolyamide, this polymer also preferably comprises blocks from PEG monomers, i.e. it is a particular type of PEBA polymer as described above with copolyamide blocks and PEG blocks.

Preferably, the PEG blocks represent at least 20% by mass relative to the mass of the copolyamide. For example, the copolyamide may comprise from 20% to 25%; or from 25% to 30%; or from 30% to 35%; or from 35% to 40%; or from 40% to 45%; or from 45% to 50%; or from 50% to 55%; or from 55% to 60% by mass of PEG blocks relative to the mass of the copolyamide.

According to certain embodiments, the copolyamide may also comprise blocks other than PEG blocks, for example PPG blocks, PTMG blocks, polyetheramines of the Jeffamine® type sold by the company Huntsman and aliphatic amines of the Baxxodur™ type sold by the company BASF.

The PEG blocks may be used as is and copolycondensed with copolyamide blocks (for example carboxyl-terminated), or transformed into polyether diamines and condensed with polyamide blocks (carboxyl-terminated).

Advantageously, the copolyamide used in the composition according to the invention is at least partially obtained from biobased starting materials.

The term "starting materials of renewable origin" or "biobased starting materials" means materials which comprise biobased carbon or carbon of renewable origin. Specifically, unlike materials resulting from fossil substances, materials composed of renewable starting materials contain $^{14}C$.

The "content of carbon of renewable origin" or "content of biobased carbon" is determined by application of the standards ASTM D 6866 (ASTM D 6866-06) and ASTM D 7026 (ASTM D 7026-04). By way of example, the COPAs based on polyamide 11 at least partly originate from biobased starting materials and have a content of biobased carbon of at least 1%, which corresponds to a $^{12}C/^{14}C$ isotope ratio of at least $1.2\times10^{-14}$. Preferably, the COPAs according to the invention comprise at least 50% by mass of biobased carbon relative to the total mass of carbon, which corresponds to a $^{12}C/^{14}C$ isotope ratio of at least $0.6\times10^{-12}$. This content is advantageously higher, notably up to 100%, which corresponds to a $^{12}C/^{14}C$ isotopic ratio of about $1.2\times10^{-12}$, in the case of COPAs derived entirely from starting materials of renewable origin.

As examples of amino acids of renewable origin, mention may be made of: 11-aminoundecanoic acid produced from castor oil, for example, 12-aminododecanoic acid produced from castor oil, for example, 10-aminodecanoic acid produced from decylenic acid obtained by metathesis of oleic acid, for example, 9-aminononanoic acid produced from oleic acid, for example.

As examples of diacids of renewable origin, mention may be made, depending on the number x of carbons in the molecule (Cx), of: C4: succinic acid from glucose, for example; C6: adipic acid from glucose, for example; C7: heptanedioic acid from castor oil; C9: azelaic acid from oleic acid (ozonolysis), for example; C10: sebacic acid from castor oil, for example; C11: undecanedioic acid from castor oil; C12: dodecanedioic acid from biofermentation of dodecanoic acid=lauric acid (rich oil: palm kernel oil and coconut), for example; C13: brassylic acid from erucic acid (ozonolysis) found in rapeseed, for example; C14: tetradecanedioic acid from biofermentation of myristic acid (rich oil: palm kernel oil and coconut), for example; C16: hexadecanedioic acid by biofermentation of palmitic acid (palm oil mainly), for example; C18: octadecanedioic acid obtained by biofermentation of stearic acid (a small amount in all plant oils but the majority in animal fats), for example; C20: eicosanedioic acid obtained by biofermentation of arachidic acid (majority in rapeseed oil), for example; C22: docosanedioic acid obtained by metathesis of undecylenic acid (castor oil), for example; C36: dimer of fatty acid resulting from the byproducts of resinous materials transformed by the Kraft process.

As examples of diamines of renewable origin, mention may be made, depending on the number x of carbons in the molecule (Cx), of: C4: butanediamine obtained by amination of succinic acid; C5: pentamethylenediamine (from lysine); and so on for the diamines obtained by amination of the diacids of renewable origin mentioned previously.

Thus, the copolyamide blocks of the copolyamide may be of totally renewable origin, i.e. resulting from the polymerization of various monomers (renewable, non-renewable or mixed) such as those mentioned above. This is the case, for example, for the copolyamide 6.6/10.10 in which the monomer "6.6" is of non-renewable origin while the monomer "10.10" is of renewable origin.

The term "copolyamide blocks of totally renewable origin included in the composition according to the invention" means the copolyamides resulting from the polymerization of various monomers, such as those mentioned above, for instance the following copolyamides: PA 11/10.10, PA 11/10.36, PA 10.10/10.36, the 11-aminoundecanoic/n-heptyl-11-aminoundecanoic copolyamide.

The copolyamide of the hot-melt adhesive composition may in particular be chosen from the following copolyamides:

- PA 6/6.6/12, the corresponding monomer mass ratios of which may be, for example (in percent): 40/20/40, 35/20/45, 45/35/20, 30/30/40, 22/18/60, 40/25/35;
- PA 6/6.6/11;
- PA 6/6.10/11;
- PA 6/6.10/12;
- PA 6/6.6/11/12, the corresponding monomer mass ratios of which may be, for example (in percent): 30/15/10/45, 30/20/20/30, or 15/25/25/35;
- PA 6/12, for example with a 70/30 mass ratio;
- PA 6.9/12, for example with a 30/70 mass ratio;
- PA Pip.9/Pip.12/11, for example with a 15/70/15 mass ratio;
- PA 6/IPD.6/12, for example with a 20/15/65 mass ratio;
- PA IPD.9/12, for example with a 20/80 mass ratio;
- PA 6/6.12/11;
- PA PA 6/6.12/12, for example with a 30/30/40 mass ratio;
- PA 6/Pip.12/12, for example with a 30/20/50 mass ratio;
- PA 6/6.12/11/PEG.12, for example with a 25/21/25/30 mass ratio;
- PA 6/11/PEG.6;
- PA 6/6.6/6.10/6.1, for example with a 40/10/40/10 mass ratio;
- PA 6.10/Pip.10/Pip.12, for example with a 20/40/40 mass ratio;
- PA 6/11/12, for example with a 10/36/54 mass ratio;
- PA Pip.12/12, for example with a 35/65 mass ratio;
- PA IPD.10/12, for example with an 80/20 mass ratio;
- PA Pip.10/12, for example with a 72/28 mass ratio;
- PA 6/11, for example with a 50/50 mass ratio;
- PA Pip.10/11/Pip.9, for example with a 65/30/5 mass ratio;
- PA 6/6.6/6.10, for example with a 35/30/35 mass ratio.

The notation PEG.6 refers to a PEG block with a C6 diacid chain limiter, and the notation PEG.12 refers to a PEG block with a C12 diacid chain limiter.

According to preferred embodiments, the copolyamide may be chosen from the copolyamides PA 6/6.6/12, PA 6/6.6/11, PA 6/6.10/11, PA 6/6.10/12, PA 6/6.12/11, PA 6/6.12/12, PA 6/6.12/11/PEG.12, PA 6/11/PEG.6, PA 6/6.6/11/12 and PA 6/Pip.12/12.

According to certain embodiments, the hot-melt adhesive composition comprises a single copolyamide above.

According to other embodiments, the hot-melt adhesive composition may comprise more than one of the above copolyamides, such as two, or three, or four, or five, or more than five of the above copolyamides.

The hot-melt adhesive composition may, in addition to the copolyamide, comprise additional polymers such as ethylene vinyl acetate (EVA) polymers and/or ethylene acrylic acid (EAA) polymers and/or ionomers.

Alternatively and preferentially, the hot-melt adhesive composition consists essentially of, or even consists of, the copolyamide(s) according to the invention and optionally one or more additives.

For example, the hot-melt adhesive composition may comprise one or more additives, which may comprise waxes, heat stabilizers and ultraviolet stabilizers, antifoams, anticaking agents (such as zinc stearate, calcium stearate, N,N-ethylenebis(stearamide)) and optical brighteners.

The hot-melt adhesive composition may have a melting point of from 85 to 150° C., and preferably from 95 to 130° C. The melting point can be determined according to the standard ISO 11357-3 Plastics—Differential scanning calorimetry (DSC) Part 3.

Preferably, the hot-melt adhesive composition has a melting point below the melting point of the textile layer. The difference between the melting point of the hot-melt adhesive composition and the textile layer may be from 15° C. to 100° C., and preferably from 30° C. to 70° C.

The melt volume rate (MVR) at 160° C./2.16 kg of the hot-melt adhesive composition may be from 2 to 200 $cm^3$/10 min, preferably 5 to 70 $cm^3$/10 min.

It is measured according to the standard ISO 1133.

Multilayer Structure

The multilayer structure according to the invention comprises:

- the textile layer as described above;
- the film as described above; and optionally (as detailed above)
- the hot-melt adhesive composition as described above between the textile layer and the film.

According to certain embodiments, the multilayer structure according to the invention consists of the textile layer, the film, and optionally the hot-melt adhesive composition.

According to other preferred embodiments, the multilayer structure may comprise, apart from these two (or three) elements, other components and/or layers and/or films.

For example, the multilayer structure may comprise a film as described above, and two textile layers as described above on either side, with adhesion on either side occurring as described above and below. Or, the multilayer structure may comprise one textile layer as described above, and two films as described above on either side, with adhesion on either side occurring as described above and below.

As a further example, the multilayer structure according to the invention may comprise additional textile layers such as layers comprising polyester, polyurethane, polyolefin, polyvinylidene chloride, and polyacrylic fibers or any other functional or structural layer known to those skilled in the art.

In certain embodiments, the multilayer structure according to the invention comprises a fluoropolymer. This may be a separate layer comprising at least one fluoropolymer or, preferably, a modification (by reaction) of one of the surfaces of the multilayer structure (for example the surface of the textile layer) to form a fluoropolymer in situ.

In other embodiments, the multilayer structure according to the invention is free of a fluorinated layer, thereby improving and facilitating the recycling of this structure.

The multilayer structure is manufactured according to a process including:

providing the textile layer as described above;

providing the film as described above;

optionally applying the hot-melt adhesive composition (as described above) to one surface of the textile layer or the film; and placing the film in contact with the textile layer, the hot-melt adhesive composition being, if present in the multilayer structure, between the film and the textile layer.

Manufacture without the adhesive composition may be performed, for example, by extrusion-coating, extrusion-casting or extrusion-blowing of the film onto the textile, or by hot pressing (thermo-lamination) at a temperature sufficient for the film to impregnate and coat the textile fibres.

Manufacture with the adhesive composition may be performed, for example, by applying the adhesive composition in a molten state or in a solvent to one of the two surfaces to be bonded (e.g. at a temperature of 180-230° C.) and then applying and pressing the other surface thereto.

Alternatively, manufacture with the adhesive composition may be performed by manufacturing a film of the adhesive composition which is then applied to the surface of the film or textile layer. This is followed by applying and pressing the other surface onto the film of the adhesive composition.

Still alternatively, manufacture with the adhesive composition may be performed by depositing a powder of the adhesive composition onto the surface of the film or textile layer (preferably the surface of the textile layer) and heating this structure to melt the adhesive composition. This is followed by applying and pressing the other surface onto the adhesive composition.

Alternatively, the adhesive composition may be applied by coating with a solvent or via a melt route.

According to certain embodiments, the hot-melt adhesive composition is applied to the surface of the textile layer.

According to other embodiments, the hot-melt adhesive composition is applied to the surface of the film.

According to certain embodiments, the hot-melt adhesive composition is applied to the entire surface of the textile layer or film.

Alternatively, the hot-melt adhesive composition is applied to a portion of this surface, for example in a pattern such as a dot pattern, a linear pattern, a check pattern, a hexagonal pattern or the like.

The multilayer structure according to the invention may be used in particular in the medical field, the sports field, hygiene, luggage, garments, clothing, household or home equipment, furnishings, carpets, automotive, industry, notably industrial filtration, agriculture and/or construction.

Recycling of the Multilayer Structure

The multilayer structure according to the invention can be recycled in its entirety, i.e. without separation of the film from the textile layer. This is possible due to the nature of the multilayer structure. In other words, the components of this structure are mutually compatible, which facilitates and improves the recycling process and allows the recycling of the entire multilayer structure.

The recycling process of the multilayer structure is preferably mechanical recycling. It thus includes the following steps:

grinding the multilayer structure to obtain particles;

melting the particles to obtain a molten mixture;

forming granules from the molten mixture.

Prior to these steps, the recycling process may include a step of separating (detaching) the multilayer structure from another structure (e.g. a metallic or polymeric structure) attached to the multilayer structure.

The grinding step is performed so as to reduce the size of the multilayer structure according to the invention. Thus, after grinding, particles of the multilayer structure are obtained. These particles may have, for example, a Dv50 size of from 0.1 to 10 mm.

Preferably, the grinding step is performed without separating the film from the textile layer. In other words, the grinding step is performed on the multilayer structure in its entirety.

The grinding step may be performed in a counter-rotating pin mill, i.e. the mill comprises a first set of brushes rotating in one direction and a second set of brushes rotating in the opposite direction. Alternatively, the grinding step may be performed in a hammer mill or in a whirl mill.

The particles obtained after the grinding step are then melted so as to obtain a molten mixture of the multilayer structure. According to certain embodiments, particles are melted in the presence of one or more additives which may comprise inert colorants such as titanium dioxide, fillers, surfactants, crosslinking agents, nucleating agents, reactive compounds, mineral or organic flame retardants, ultraviolet (UV) or infrared (IR) light absorbers, UV or IR fluorescent agents, waxes, heat stabilizers (for example phenolic or phosphorus based), antiblocking agents or antifoams. Typical fillers include talc, calcium carbonate, clay, silica, mica, wollastonite, feldspar, aluminum silicate, alumina, hydrated alumina, glass microspheres, ceramic microspheres, thermoplastic microspheres, baryte, and wood flour.

The particles can be melted at a temperature of from 150 to 300° C., and preferably from 180 to 280° C.

Optionally, this process may include a step of filtration of the melt so as to remove impurities having, for example, a particle size of from 5 μm to 1 mm.

Finally, the melt (filtered or unfiltered) is then used to form recycled granules of the multilayer structure. More particularly, the granules may be formed by extrusion.

According to certain embodiments, the recycled granules can be used for the manufacture of a multilayer structure according to the invention and more particularly for the manufacture of a film according to the invention. In this case, the recycled granules can be used as such or with the addition of an amount of PEBA copolymer according to the invention.

According to other embodiments, the recycled granules can be used in other applications such as the manufacture of buttons, the manufacture of zippers, and also the manufacture of injection-molded articles in any other field such as automotive, sports, household goods, packaging, clothing and electronics. In particular, the recycled granules can be fed into an extruder or an injection molding press to manufacture an extruded or injection-molded article.

EXAMPLE

The examples below illustrate the present invention without limiting the scope thereof.

Film A composed of PA11/PEG.6 (40/60 by weight) where Mn (PA11): 1000 g/mol and Mn (PEG): 1500 g/mol, Tm=150° C.

Film B composed of PA 6/6.12/11/PEG.12 (24.5/20.9/24.5/30.1/by weight, respectively) where Mn (PA): 2000 g/mol, and Mn (PEG): 600 g/mol, Tm=100° C.

A/B bilayer films are also made while maintaining a total thickness of 25 μm.

The water vapor permeability is measured according to the standard ASTM E96B—38° C./50% RH and given by the MVTR:

MVTR (Film A)=3000 g/$m^2$/24 h

MVTR (Film B)=1600 g/$m^2$/24 h

| Thickness of layer A | Thickness of layer B | MVTR (g/$m^2$/24 h) |
|---|---|---|
| 25 μm | 0 | 3000 |
| 20 μm | 5 μm | 2500 |
| 15 μm | 10 μm | 2000 |
| 10 μm | 15 μm | 1800 |
| 0 | 25 μm | 1600 |

The films are then hot-bonded to a 107 g/$m^2$ nylon fabric at 130° C. under a pressure of 1 bar for 30 s. The adhesion is evaluated manually:

| Layer A thickness | Layer B thickness | Adhesion quality |
|---|---|---|
| 25 μm | 0 | nonexistent |
| 20 μm | 5 μm | mean |
| 15 μm | 10 μm | good |
| 10 μm | 15 μm | good |
| 0 | 25 μm | excellent |

It has been observed that film A has good water vapor permeability but poor adhesion capacity on a nylon textile, whereas the use of film B alone or in combination with film A makes it possible to improve the adhesion capacity while at the same time maintaining good water vapor permeability.

The invention claimed is:

1. A multilayer structure comprising:

a textile layer comprising at least one polymer chosen from a polyamide and a copolymer containing polyamide blocks and polyether blocks and also combinations thereof; and a film comprising at least one copolymer containing polyamide blocks and polyether blocks, the polyether blocks comprising polyethylene glycol blocks, the polyethylene glycol blocks representing at least 40% by mass relative to the mass of the film;

in which the film adheres to the textile layer via a copolyamide.

2. The multilayer structure as claimed in claim 1, in which the copolymer containing polyamide blocks and polyether blocks of the film comprises copolyamide blocks.

3. The multilayer structure as claimed in claim 2, in which the film adheres directly to the textile layer.

4. The multilayer structure as claimed in claim 1, in which the film is attached to the textile layer via a hot-melt adhesive composition comprising the copolyamide.

5. The multilayer structure as claimed in claim 4, in which the copolyamide of the hot-melt adhesive composition is chosen from PA 6/6.6/12, PA 6/6.6/11, PA 6/6.10/11, PA 6/6.10/12, PA 6/6.12/11, PA 6/6.12/12, PA 6/6.12/11/PEG.12, PA 6/11/PEG.6, PA 6/6.6/11/12 and PA 6/Pip.12/12.

6. The multilayer structure as claimed in claim 4, in which the hot-melt adhesive composition has a melting point that is lower than the melting point of the textile layer.

7. The multilayer structure as claimed in claim 4, in which the hot-melt adhesive composition has a melting point of less than or equal to 150° C.; and/or a melt volume rate MVR of from 2 to 200 cm3/10 min.

8. The multilayer structure as claimed in claim 1, in which the polymer of the textile layer is a polyamide.

9. The multilayer structure as claimed in claim 1, in which the polyamide blocks of the copolymer containing polyamide blocks and polyether blocks in the film are chosen from polyamide 11 blocks, polyamide 12 blocks, polyamide 6 blocks, polyamide 6.10 blocks, polyamide 6.12 blocks, polyamide 10.10 blocks, polyamide 10.12 blocks, polyamide 10.14 blocks, and combinations thereof.

10. The multilayer structure as claimed in claim 1, in which the film has a thickness of from 1 to 50 μm.

11. The multilayer structure as claimed in claim 1, in which the film consists of the copolymer containing polyamide blocks and polyether blocks and optionally one or more additives chosen from inert colorants, fillers, surfactants, crosslinking agents, nucleating agents, reactive compounds, mineral or organic flame retardants, ultraviolet or infrared light absorbing agents, waxes, heat stabilizers, antiblocking agents, antifoams, and ultraviolet or infrared fluorescent agents.

12. The multilayer structure as claimed in claim 1, in which the film is obtained by recycling a multilayer structure.

13. A process for manufacturing a multilayer structure as claimed in claim 1, comprising:

providing the textile layer;

providing the film;

optionally applying the hot-melt adhesive composition to a surface of the textile layer or the film; and placing the film in contact with the textile layer, the hot-melt adhesive composition being, if present in the multilayer structure, between the film and the textile layer.

14. A process for recycling the multilayer structure as claimed in claim 1, comprising:

grinding the multilayer structure to obtain particles;

melting the particles to obtain a molten mixture; and forming granules from the molten mixture.

15. An article comprising the multilayer structure as claimed in claim 1, chosen from a dressing, a gauze, a cloth, a carpet, a rug, an upholstery, a surface covering, an interior covering, a sofa, a curtain, bedding, a mattress, a pillow, clothing, notably an item of sportswear or a medical garment.

* * * * *